Aug. 25, 1942.  R. F. STALLMAN  2,294,216
OVERDRIVE TRANSMISSION
Filed Aug. 16, 1939
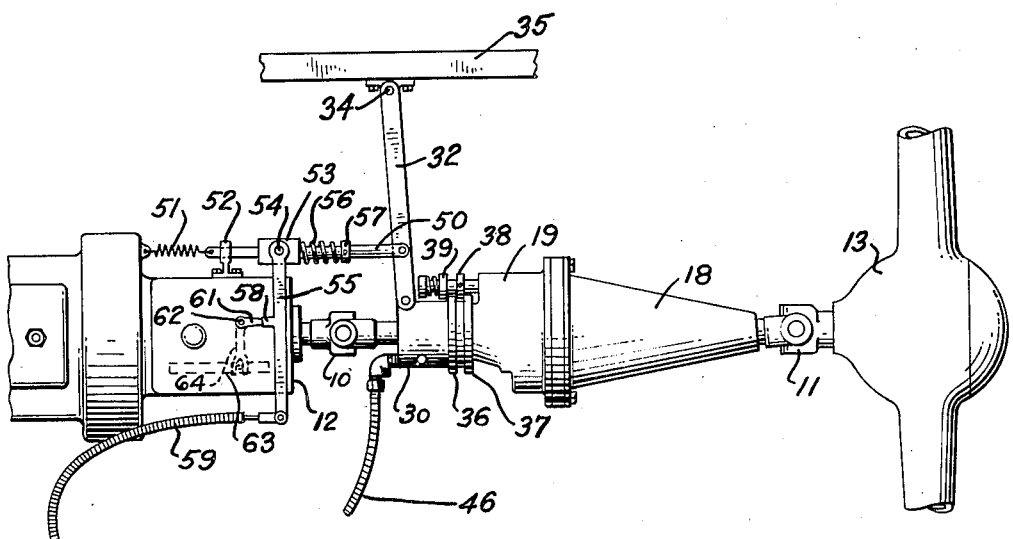
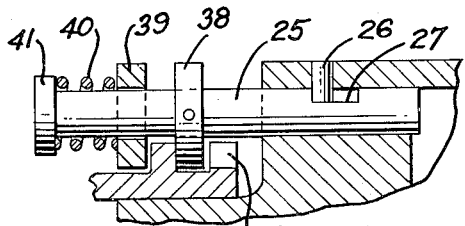
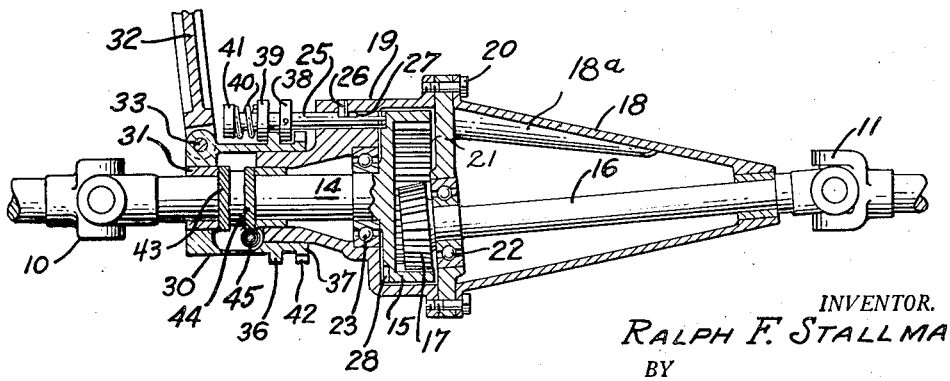
INVENTOR.
RALPH F. STALLMAN
BY
Chas. E. Townsend
ATTORNEY.

Patented Aug. 25, 1942

2,294,216

UNITED STATES PATENT OFFICE 2,294,216

OVERDRIVE TRANSMISSION

Ralph F. Stallman, San Francisco, Calif.

Application August 16, 1939, Serial No. 290,445

8 Claims. (Cl. 74—332)

The present invention relates to transmissions and particularly to an auxiliary transmission usually referred to as overdrive, employed in automobiles to obtain a gear ratio higher than that of conventional high gear.

Many automobiles are sold without an overdrive transmission and some are sold with an overdrive transmission which may be installed at the option of the purchaser, while in other makes of automobiles where the manufacturer does not provide for such a transmission, it is common practice for manufacturers of accessory devices for automobiles to make up transmissions of this type for installation.

It is therefore desirable that an overdrive transmission be designed for installation in automobiles with as little change as possible in arrangement of the conventional parts, and that it be made in such a manner that it can readily be adapted to automobiles of different makes.

It is an object of the present invention to provide a transmission that may be placed in an automobile with a minimum of mechanical alteration.

A further object is the provision of a transmission for automobiles that will be principally supported between two fixed points such as the centers of the conventional universal joints in a propeller shaft, and which need not therefore take support from any part of the frame.

A further object is the provision of a transmission of very simple and inexpensive construction with constantly meshing gears adapted to be controlled to effect a direct or overdrive, and to provide means for preventing the transmission being operated in overdrive except when the conventional automobile transmission is in its high gear position and to accomplish automatic shifting of the overdrive transmission to direct drive in the event the conventional transmission is shifted from high gear to first or second gear.

A further object is the provision of a connection for a speedometer having two gear ratios in order to compensate for the difference between direct and overdrive power transmission and means for effecting automatic shifting of this speedometer connection upon shifting of the overdrive transmission.

One form of the invention is illustrated in the accompanying drawing, and reference to this drawing is made in the following specification, wherein further objects and advantages of the invention are made apparent.

In the drawing—

Fig. 1 is a plan view of a transmission constructed in accordance with the present invention and illustrated as assembled in position between the universal joints of a conventional automobile, parts of which are shown for purposes of illustration;

Fig. 2 is a horizontal sectional view through the transmission illustrated in Fig. 1; and Fig. 3 is an enlarged detail of part of the mechanism illustrated in Fig. 2.

Referring to the drawing in detail, the transmission is shown as positioned between the forward universal joint 10 and the rear universal joint 11 of an automobile, and thus occupying the position ordinarily occupied by the propeller shaft which transmits power through these universal joints from the conventional transmission enclosed in the housing 12 to the conventional differential enclosed in the housing 13. While a specific type of universal joint is illustrated, it will be apparent from the following description that the transmission may be supported between any conventional connections designed for the purpose of transmitting universal movement.

Referring to Fig. 2, the overdrive transmission is shown as comprising a drive shaft 14 to the rear end of which is fixed a drum shaped internally toothed gear 15. A driven shaft 16 carries a pinion 17 which meshes with the internal gear 15. The shafts 14 and 16 are connected with the universal joints 10 and 11 respectively, and by virtue of the gears 15 and 17 being in mesh, they serve to transmit power from the conventional transmission to the differential gearing and thus to the rear axle of the automobile. The gears 15 and 17 are in constant mesh and the difference in driving ratio is effected by causing the gear 15 to drive the gear 17 about its own axis or by causing the gear 15 to carry the gear 17 with it so that the gear 17 and shaft 16 are revolving not about their own axis but about the axis of the gear 15 and shaft 14. The gears and shafts thus far described are encased by a housing which comprises a rear half 18 and a forward half 19 secured together as by bolts 20, which bolts also serve to clamp in position between the halves of the housing a wall or plate 21 in which there is an eccentrically positioned opening for the reception of a suitable bearing 22 which supports the forward end of the shaft 16. The forward housing part 19 contains a bearing 23 which likewise serves to support the shaft 14 for rotation.

If the housing which includes the parts 18 and 19 is keyed to either of the shafts 14 or 16 so that relative rotation between the housing and shafts is prevented, a direct drive will be imparted through the transmission. In order so to key or connect the housing with a shaft, the forward portion 19 of the housing is bored for the reception of a pin 25 which is reciprocable within limits defined by a stop pin 26 and a slot 27. The rear end of the pin 25 is engageable upon the pin being moved rearwardly with notches 28 formed in the periphery of the gear 15. The notches may be spaced at suitable intervals, although a single notch or two notches spaced 180° will be adequate. When the pin 25 is engaged with any of the notches 28, the gear 15 and consequently the shaft 14 to which it is fixed are locked against rotation relative to the housing. Consequently, when the drive shaft rotates, it carries with it the housing part 19 as well as the part 18 and the intermediate plate 21. The eccentric bearing opening in the plate 21 consequently moves with the gear 15 and the gears 15 and 17 are relatively fixed so that the driven shaft 16 rotates at the same speed as the drive shaft 14. A suitable counterweight 18a may be provided interiorly of the housing part 18 to compensate for the eccentric position of the shaft 16 and to overcome any tendency toward excessive vibration that would result from the revolving of this shaft about the axis of the drive shaft 14.

In order to effect overdrive at a rate which depends upon the ratio between the gears 15 and 17, the casing is freed from its connection with the shaft and is locked against rotation. This is effected through the medium of a torque sleeve 30 mounted for reciprocal movement longitudinally of the shaft 14. This torque sleeve 30 fits slidably over the forward end of the casing part 19 and has a bushing 31 in its forward end which is slidably and rotatably fitted to the shaft 14. A torque arm 32 is pivotally connected as at 33 with the torque sleeve 30 and pivotally or otherwise loosely connected as at 34 to a suitable bracket fixed to the frame of the automobile, a portion of which frame is indicated at 35 in Fig. 1. The torque arm 32 serves at all times to prevent rotation of the torque sleeve 30 but to permit longitudinal sliding movement thereof relative to the shaft 14. Toward its rear end the torque sleeve 30 is provided with a pair of external annular integrally formed collars 36 and 37. The collar 36 engages between a fixed collar 38 on the pin 25 and a sliding collar 39 on said pin, the collar 39 being urged toward the rear end of the pin by a spring 40 interposed between the collar and a head 41 on the pin, as is most clearly shown in Fig. 3 of the drawing.

The collar 37 on the torque sleeve 30 is provided with peripherally spaced notches 42 shaped to register with the collar 38 on the pin 25 and thus to form a lock between the torque sleeve and the housing part 19 by which the pin 25 is carried. In order to shift from the direct drive position illustrated in Fig. 2 to overdrive position, the torque sleeve 30 is moved forwardly. Upon such movement the collar 36 on the torque sleeve engages collar 39, withdrawing the pin 25 from its connection with the gear 15, then compressing the spring 40 until the collar 37 aligns with the collar 38, with the latter collar being received in one of the notches 42. In this position the housing is locked against rotation with respect to the torque sleeve which, in turn, is prevented from rotating by means of the torque arm 32. Now upon rotation of the drive shaft 14, the gear 15 therein rotates relative to the housing and plate 21, which is fixed to the housing, holds the bearing 22 in a fixed position, the gear 17 is rotated about its own axis, imparting rotation to the shaft 16 at a speed greater than that of the shaft 14.

Adjacent the forward end of the shaft 14 are a pair of speedometer worms 43 and 44 adapted to mesh with a gear 45 which is fixed in the conventional manner to the end of the cable 46 (see Fig. 1), which transmits rotary movement from the drive shaft to the speedometer. As the gear 45 is carried by the torque sleeve 30, sliding movement of this sleeve in the shifting operations described above effects shifting of this gear from one to the other of the worms 43 and 44. These worms are pitched to compensate the speed of rotation of the speedometer cable with the difference in ratio produced in shifting the overdrive. The pitch of the worms 43 and 44 varies but slightly, and in order that both worms will mesh with the single gear 45, this gear is cut twice; that is to say, it is cut first with a cutter corresponding in pitch to the worm having the least pitch and then re-cut with a cutter corresponding in pitch to the other worm. With this system of cutting the gear 45, one of the worms will mesh with one half of all of the gear teeth, and the other will mesh with the other half of the teeth.

In order that the transmission may conveniently be shifted from the operator's seat of the automobile, there is connected to the torque arm 32 a link 50, the forward end of which is connected by a light tension spring 51 to a suitable anchorage on the motor as shown, or on any convenient fixed part of the automobile. A bracket 52 may be provided for guiding the forward end of the link 50. Intermediate the ends of the link 50 a sliding collar 53 carries a pin 54 to which is pivoted an actuating lever 55. A compression spring 56, heavier than the spring 51, is interposed between the sliding collar 53 and a collar 57 fixed to the link 50. The actuating lever 55 is provided with a fulcrum lug 58 intermediate its ends and is connected to its outer end with a Bowden cable 59 of conventional structure which may lead to the instrument panel or other convenient position adjacent the operator's seat, and which terminates in a control knob 60. Upon the control knob 60 being pulled outwardly, the lever 55 is pivoted about its fulcrum lug 58 and, through the collar 53 and the compression spring 56, imparts rearward movement to the link 50, which in turn moves the torque sleeve 30 to the rear through the medium of the torque arm 32, thus shifting the transmission to its overdrive position. Upon pushing the control knob 60 inwardly, the pressure on the compression spring 56 is released and the tension spring 51 operates to shift the transmission back to direct or conventional drive.

It is desirable that the overdrive be operable only when the main transmission is in high gear, and the present invention contemplates means for preventing operation of the overdrive except when the automobile is operating in high gear, and furthermore, it provides for automatic shifting of the transmission from overdrive to direct drive in the event that the main transmission is shifted from high gear back to second or first. To this end the fulcrum lug 58 on the actuating lever 55 operates against the end of a lever 61. This lever is fixed to a pin 62 which is rotatably journalled in the top of the housing 12 which encloses the main transmission of the automobile. The main transmission includes the customary band shown in dotted lines at 63, and the pin 62 is connected to this band by a lever 64 within the housing 12. When the main transmission is shifted to its high gear position, the shift band 63 moves forwardly and through the lever 61 turns the pin 62 and swings the lever 61 thereon to the position shown in which its end serves as pivot point for the fulcrum lug 58. Upon shifting of the main transmission to any other position, the lever 61 is swung away from the lug 58, with the result that the actuating lever 55 can not be actuated to shift the transmission to its overdrive position because it has no fulcrum point upon which to swing. Furthermore, if the auxiliary transmission was in overdrive when the main transmission was shifted out of high gear, the lever 61 would move away from the lug 58, thus permitting the spring 51 automatically to shift the auxiliary transmission to its direct drive position. One of the important features of the present invention is that the auxiliary transmission is connected to and entirely supported by the universal joints which ordinarily support the propeller shaft, and receives no support from any other part of the automobile. This provides for easy installation and makes the transmission readily adaptable to automobiles of different sizes and types. While the torque arm 32 connects with the frame, and parts of the operating mechanism are connected to other parts of the vehicle, none of these parts serves to support any of the weight of the transmission itself.

The transmission as herein illustrated and described is designed for use in an automobile to provide an overdrive or a driving ratio higher than high gear in the main transmission. It is to be understood, however, that the invention is not limited to the specific structure or use illustrated, as it is readily adaptable to trucks or other heavy vehicles and can, upon reversal of its operating parts, function as an underdrive to provide gear ratios lower than those provided by the main transmission of the vehicle.

In order to cause the transmission to operate as an underdrive, it is simply necessary to reverse the positions of its connections with the universal joints 10 and 11. The torque arm 32 would then connect with the frame 35 approximately opposite the rear universal joint 11 and the rod 50 would be extended the amount necessary to effect connections with the torque arm.

Having thus described my invention, what I claim and desire to secure by Letters Patent is:

1. In a transmission of the character described, a drive shaft, a driven shaft, gears connecting said shafts for operation in direct or overdrive ratio, a housing rotatably supported with respect to one of said shafts, means to key the housing to said shaft to effect a direct drive and means to prevent rotation of the housing to effect an overdrive.

2. In a transmission of the character described, a drive shaft with a large gear thereon, a driven shaft with a small gear meshing with said large gear, a housing embracing the gears and maintaining the gears in mesh, means for locking the housing to said large gear for rotation therewith whereby the small gear will travel with the large gear and means for locking the housing against rotation whereby the large gear will impart rotation to the small gear.

3. In an auxiliary transmission for automobiles including means for changing the driving ratio, a speedometer connection comprising a pair of gears of different pitch to compensate for changes in driving ratio, a worm adapted to mesh with either of said gears and means for shifting said worm to mesh selectively with said gears automatically upon changing the driving ratio.

4. In a transmission of the character described, a pair of shafts, gears connecting said shafts, a rotatable housing enclosing said gears, said shafts, gears, and housing being adapted to be supported by and between the conventional universal joints of an automobile, and a torque arm engaging a fixed part of the automobile and associated with means selectively to permit or prevent rotation of the housing.

5. In a transmission of the character described, a pair of shafts, gears connecting said shafts, a rotatable housing enclosing said gears, said shafts, gears, and housing being adapted to be supported by and between the conventional universal joints of an automobile, a torque sleeve slidably embracing one shaft, a torque arm engaging between said sleeve and the frame of the automobile, and means to lock the housing relative to the torque sleeve upon sliding movement of the latter.

6. A transmission for automobiles adapted to occupy the position between two universal joints ordinarily occupied by a propeller shaft comprising, an internal ring gear on an axis aligned with both universal joints, a pinion gear in constant mesh with the ring gear and rotating on an axis aligned with only one of said joints, and means for changing the gear ratio of said transmission without disengaging said gears.

7. A transmission for automobiles adapted to occupy the position between two universal joints ordinarly occupied by a propeller shaft comprising, one gear rotatable on an axis aligned with both universal joints a second gear in constant mesh with said one gear and rotatable on an axis aligned with only one of said joints, and means for changing the gear ratio of said transmission without disengaging said gears.

8. A transmission adapted to be positioned between and receive its principal support from the two universal joints which normally support the propeller shaft of an automobile comprising, one gear rotatable on an axis common to both said joints a second gear in constant mesh with said one gear and rotatable on an axis common to but one of said joints, and means for changing the gear ratio of said transmission without disengaging said gears.

RALPH F. STALLMAN.